United States Patent
Bowman et al.

(10) Patent No.: US 8,079,221 B2
(45) Date of Patent: Dec. 20, 2011

(54) VARIABLE GEOMETRY HYSTERESIS CONTROL FOR A GAS TURBINE ENGINE

(75) Inventors: Ray F. Bowman, Carmel, IN (US);
Joseph A. Jaeger, Greenwood, IN (US);
Phillip J. Steffen, Avon, IN (US);
Robert G. Kiser, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 13/004,633

(22) Filed: Jan. 11, 2011

(65) Prior Publication Data

US 2011/0167780 A1    Jul. 14, 2011

Related U.S. Application Data

(62) Division of application No. 11/253,159, filed on Oct. 18, 2005, now Pat. No. 7,866,159.

(51) Int. Cl.
*F02C 9/00* (2006.01)
(52) U.S. Cl. .................................................... 60/794
(58) Field of Classification Search .................. 60/39.25, 60/39.27, 772, 773, 794; 415/36, 149.2, 415/149.4, 155
See application file for complete search history.

(56) References Cited

U.S. PATENT DOCUMENTS

| | | | |
|---|---|---|---|
| 4,947,643 | A | 8/1990 | Pollak et al. |
| 5,042,245 | A | 8/1991 | Zickwolf, Jr. |
| 5,133,182 | A | 7/1992 | Marcos |
| 5,222,356 | A | 6/1993 | Evenson et al. |
| 5,357,748 | A | 10/1994 | Khalid |
| 5,622,045 | A | 4/1997 | Weimer et al. |
| 6,129,511 | A | 10/2000 | Salvage et al. |
| 6,272,859 | B1 | 8/2001 | Barnes et al. |
| 6,487,847 | B1 | 12/2002 | Snow et al. |
| 6,681,573 | B2 | 1/2004 | Arnold |
| 2004/0030417 | A1 | 2/2004 | Gribble et al. |

FOREIGN PATENT DOCUMENTS

EP    0 363 301 A1    4/1990

*Primary Examiner* — Louis Casaregola
*Assistant Examiner* — Phutthiwat Wongwian
(74) *Attorney, Agent, or Firm* — Krieg DeVault LLP

(57) ABSTRACT

One embodiment of the present application is a gas turbine engine with a compressor that includes a variable geometry mechanism to vary working fluid flow area. A desired state of this mechanism is selected different than a current state to change the amount of flow area. The mechanism has a hysteresis band corresponding to a difference between increasing the flow area to reach the desired state and decreasing the flow area to reach the desired state. To control operation of the mechanism within this hysteresis band, a determination is made whether the desired state corresponds to a greater flow area or a lesser flow area relative to the current state.

6 Claims, 8 Drawing Sheets

VARIABLE GEOMETRY HYSTERESIS CONTROL FOR A GAS TURBINE ENGINE

CROSS-REFERENCE TO RELATED APPLICATIONS

The present application is a divisional application of U.S. patent application Ser. No. 11/253,159, filed Oct. 18, 2005, now U.S. Pat. No. 7,866,159, and is incorporated herein by reference.

BACKGROUND

The present invention relates to variable geometry mechanism control, and more particularly, but not exclusively, relates to control of mechanical hysteresis in compressor variable geometry vanes of a gas turbine engine.

There continues to be an interest in utilizing variable geometry mechanisms in gas turbine engines—especially in compressors for the high-pressure ratio engine variety used for aircraft. Within these mechanisms, one or more mechanical components can display hysteresis. In some cases, it is desirable to account for such characteristics during engine operation. Thus, there remains a need for further contributions in this area of technology.

SUMMARY

One embodiment of the present invention includes a unique technique for controlling variable geometry of vanes in a gas turbine engine. Other embodiments include unique apparatus, systems, methods, or devices to control mechanical hysteresis of variable geometry vanes in a gas turbine engine, including but not limited to Compressor Variable Geometry (CVG). Further embodiments, forms, objects, features, aspects, benefits, and advantages of the present invention shall become apparent from the detailed description and drawings contained herein.

DETAILED DESCRIPTION OF SELECTED EMBODIMENTS

Figure 1:
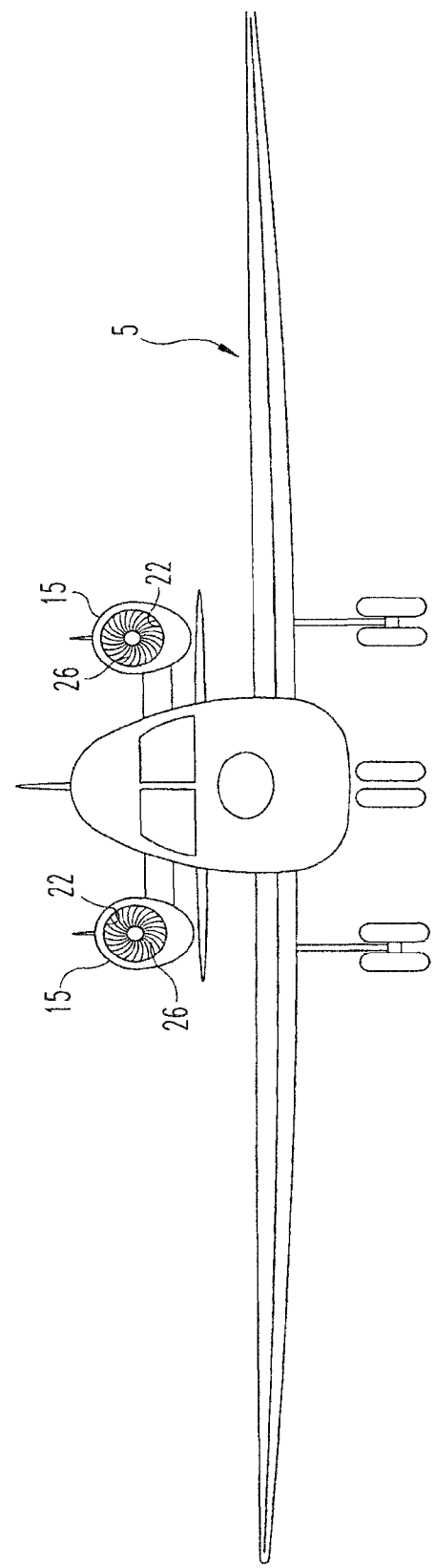
FIG. 1 is a diagrammatic view of an aircraft including gas turbine engines.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

It has been discovered that movement of actuation linkages to change the setting of a variable geometry vane mechanism can result in a positional variation that depends on whether a new setting is approached with a pushing (compression) or pulling (tension) force. This positional variation corresponds to a mechanical hysteresis band. Typically, the position of one part relative to another varies with the manner of movement because of play or slack in the interconnection of such parts. This play or slack may result from normal part tolerances, wear, and/or environmental conditions to name just a few possibilities.

In one embodiment of the present invention, a variable geometry vane arrangement has a range of positions from a most open position to a most closed position. The arrangement has a degree of hysteresis depending on whether a desired position is approached from a more open position or more closed position, where the resulting difference in approach corresponds to a hysteresis band. To correct for this hysteresis, the desired position is approached from the same direction whether starting the transition from a more open position or a more closed position. In this context, a "direction" is either: (1) a closing direction corresponding to a change from a more open position to less open position or (2) an opening direction corresponding to a change from a less open position to a more open position; where the closing direction and the opening direction are opposite one another.

In one example, transition from a more open position to less open position is performed by change in the closing direction, while transition from a less open position to a more open position is performed by a change in the opening direction past the desired position and reversing to approach the desired position from the closing direction. This form tends to place the arrangement at the high end of the hysteresis band. In another form, transition from a less open position to more open position is performed by change in the opening direction, while transition from a more open position to a less open position is performed by change in the closing direction past the desired position and reversing to approach the desired position from the opening direction. Hysteresis correction according to this embodiment may be performed only in response to certain specified conditions, or all of the time.

Referring to FIG. 1, another embodiment of the present invention is shown. In FIG. 1, an aircraft 5 is shown with two gas turbine engines 15. The engines 15 are suitable to provide thrust to propel the aircraft 5 in a standard manner. The engines 15 are of a turbofan type arranged in a dual spool configuration as further described hereinafter. Additionally referring to FIG. 2, a diagrammatic view of a gas turbine engine system 10 is illustrated, with only one of the engines 15 shown to preserve clarity. It should be understood that the other engine 15 of aircraft 5 is likewise arranged. The gas turbine engine 15 is coupled to a standard fuel regulator (not shown) and a controller 50. The gas turbine engine 15 is of a twin spool configuration defining a working fluid pathway 21 with an inlet 22, an exhaust outlet 23, and a bypass duct 29. Adjacent inlet 22 is a hub 24 of the gas turbine engine 15. A low pressure compressor 25 includes a fan 26 as a first stage. Furthermore, a low pressure compressor 25 is connected to a low pressure turbine 27 by an inner shaft 28 forming a low pressure spool 20 which rotates about rotational axis R.

The gas turbine engine 15 also includes a high pressure spool or core 30. Core 30 is situated along the working fluid pathway 21 between the low pressure compressor 25 and the low pressure turbine 27. Core 30 includes a high pressure compressor 35 connected to a high pressure turbine 37 by an outer shaft 38 which rotates about axis R and inner shaft 28 of the low pressure spool 20. Between high pressure compressor 35 and high pressure turbine 37 are combustors 39. The combustors 39 are provided fuel from a fuel feed line (not shown) that is controllably supplied by the fuel regulator (not shown). Fuel supplied by this regulator to the combustors 39 is controlled by signals output by the controller 50.

The gas turbine engine 15 includes several members that are driven to rotate by working fluid as the working fluid flows along the pathway 21. These rotating members include the fan 26, the compressors 25 and 35, the turbines 27 and 37, and correspondingly the low pressure spool 20 and the core 30. The high pressure compressor 35 includes a plurality of blades 36a interleaved with a number of stators 36b. At least some of stators 36b may be operable to rotate about a corresponding variable geometry axis along a longitudinal axis that extends radially from the rotational axis R to provide Compressor Variable Geometry (CVG) in response to control signals from the controller 50, as more fully described hereinafter. The variable geometry axes are more specifically described in connection with FIGS. 3 and 4 hereinafter.

The mechanical operation of the gas turbine engine 15 includes drawing air as a working fluid through the inlet 22, pressurizing it with the compressors 25 and 35, mixing the pressurized air with fuel to provide a combustible fuel charge, and igniting the fuel charge to provide combustion within the combustors 39. The rapidly expanding gases resulting from this combustion drive the turbines 27 and 37 which extract power therefrom including the power needed to rotate the compressors 25 and 35. The working fluid exits low pressure turbine 27 through outlet 23 generating thrust in a direction opposite the direction of the exiting exhaust gases. In one preferred embodiment, the gas turbine engine 15 is a type of AE3007 turbofan engine manufactured by Rolls-Royce Corporation.

The thrust generated by the gas turbine engine 15 corresponds to fuel selectively provided over a fuel line by the fuel regulator (not shown), which modulates fuel flow provided to the combustors 39 in response to control signals from the controller 50. Controller 50 provides these control signals in accordance with controller operating logic 52.

The controller 50 can include analog circuitry, digital circuitry, or a combination of these. As an addition or alternative to electronic circuitry, controller 50 may include one or more other types of components or control elements. Controller 50 may be comprised of one or more components configured as a single unit or if of a multicomponent form, as a number of separate units. For such multicomponent forms, the controller 50 can have one or more components remotely located relative to the others, or otherwise have its components distributed. Controller 50 can be based on one or more general purpose integrated circuit chips, semicustom circuitry such as a Field Programmable Gate Array (FPGA) or the like, a fully customized circuit type, a combination of these, or such different type as would occur to those skilled in the art. Controller 50 and/or system 10 also includes control clocks; power supplies; signal conditioners; filters; limiters; Analog-to-Digital Converters (ADCs); Digital-to-Analog Converters (DACs); communication ports and/or interfaces; or other types of circuits, devices, operators, elements, or components as would occur to those skilled in the art to implement the present invention.

The controller 50 may be software and/or firmware programmable, a state logic machine, other operationally dedicated hardware, or a hybrid combination of any of these. Controller 50 can include one or more memory devices (not shown), including but not limited to the solid-state, optical, and/or magnetic variety. Such memory can provide storage for programming instructions executable by controller 50 as applicable to the controller type, and/or can be arranged for reading/writing of data in accordance with one or more program routines. It should be appreciated that controller 50 operates in accordance with the control logic 52 to perform various routines, procedures, and the like—including those operations and conditionals described hereinafter. This operating logic can be in the form of software programming instructions, firmware, programming of a gate array and/or application specific circuitry, other hard-wired logic/circuitry, or a combination of these, just to name a few examples. In one embodiment common to aircraft applications of the AE3007 type of engine 15, controller 50 is provided as a Full Authority Digital Engine Control (FADEC). For this embodiment, the FADEC digitizes all signals received in an analog format for use as a corresponding variable or value by a computer program form of logic 52. In one variation of this embodiment, two FADECs are used in a dual redundant configuration (not shown) to provide enhanced reliability in the event one fails.

The controller 50 is responsive to a number of input signals. For example, in the depicted embodiment controller 50 receives throttle angle signal TLA from an aircraft cockpit thrust control throttle 60. TLA corresponds to a desired engine thrust. Other signals provided to controller 50 correspond to various environmental parameters, such as Total Air Temperature TAT corresponding to the surrounding air temperature as sensed by a sensor 71, Mach Number MN corresponding to the rate of travel of the aircraft 5 with respect to the speed of sound as sensed by a sensor 72, pressure altitude PALT corresponding to the altitude as sensed by a sensor 73. As shown, these three signals are supplied as analog electrical signals to an Air Data Computer (ADC) 70 which converts them to a digital signal form for input to controller 50. In another embodiment, an ADC and controller may be included in a common unit. The controller 50 also receives four signals corresponding to various performance parameters of the gas turbine engine 15. Rotational speed of the low pressure spool 20, N1, is sensed by a sensor 81. T2.5 is sensed by a sensor 82 and corresponds to temperature between the compressors 25 and 35. N2 is sensed by a sensor 83 that corresponds to rotational speed of the core 30. ITT is sensed by a sensor 84 and corresponds to interturbine temperature—the temperature between the turbines 27 and 37. In one embodiment, signals N1, T2.5, N2 and ITT are provided to the controller 50 as analog electrical signals which are then converted into a digital format therein. Collectively, these signals are designated by a path 90. In other embodiments, more, fewer, or otherwise different input signals, corresponding sensors, and the like may be utilized or may be absent as would occur to one skilled in the art, and/or may or may not include an ADC.

In one arrangement, the system 10 uses mechanical fan speed N1, as a primary feedback control signal. A varying thrust request signal is generated that corresponds to desired/requested thrust selected with the throttle 74 as selectively corrected for environmental factors input as PALT, MN, and TAT. This thrust request signal can be further limited, filtered, and/or otherwise conditioned. The feedback signal is subtracted from the request signal, as optionally corrected/conditioned, to obtain a control error signal corresponding to N1 speed error (a negative feedback arrangement). This error signal may be further tested, limited, and/or otherwise conditioned to prevent an undesirable degree/manner of operational change. The resulting fan speed error signal, with optional conditioning, is determined by the controller 50 and sent to the fuel regulator to modulate the fuel supplied to the engine 15. Gas turbine engine 15 responds to fuel flow adjustments with a change in speed of the turbines 27 and 37. As turbine speed changes so does fan speed N1 due to the connecting shaft 28. The loop continues from the gas turbine engine 15 with input signal Ni to controller 50 via path 90. Thus, while N1 differs from the desired fan speed, a corresponding fuel control speed adjustment signal is sent to the fuel regulator by controller 50. Once this desired fan speed is reached, controller 50 stops adjusting fuel to change turbine speed. When fan 26 is damaged or is performing as though it is damaged, an alternative or synthetic source of N1 can be utilized as further explained in U.S. Pat. No. 5,622,045 (which is hereby incorporated by reference in its entirety) and/or different operational arrangements could be utilized as would occur to one skilled in the art.

Through the primary feedback control loop based on fan speed N1, the core speed N2 is controlled. Further, there is a secondary control loop that can influence fueling that is based N2—and in particular, generally seeks to maintain a given N2 versus N1 relationship within acceptable operating parameters. To provide better fuel efficiency, CVG is typically employed to reduce N2 below a level that would otherwise be required. In turn, high pressure compressor efficiency is often improved.

Figure 2:
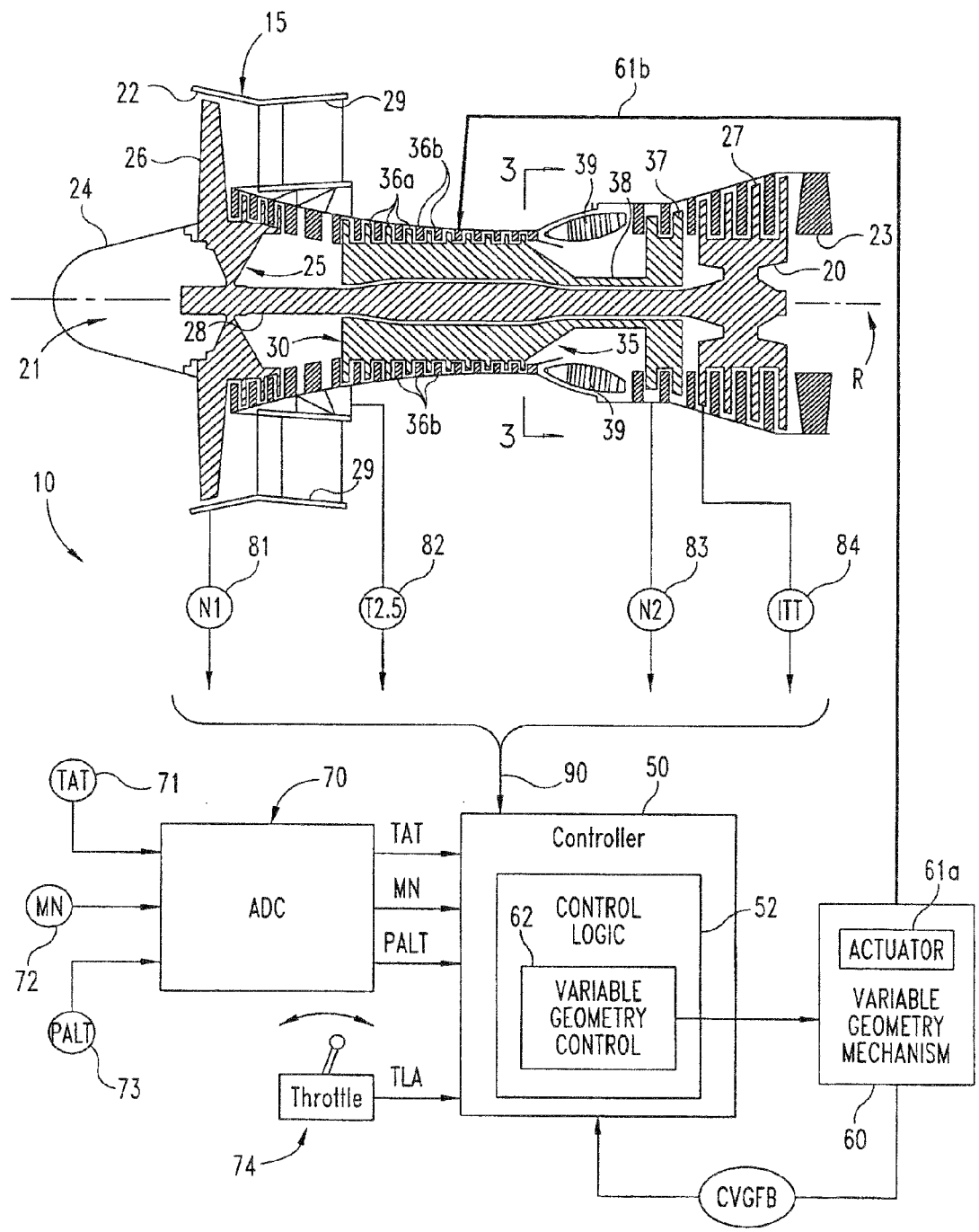
FIG. 2 is a diagrammatic view of a control system for the aircraft of FIG. 1 showing one of the gas turbine engines in section.
Figure 3:
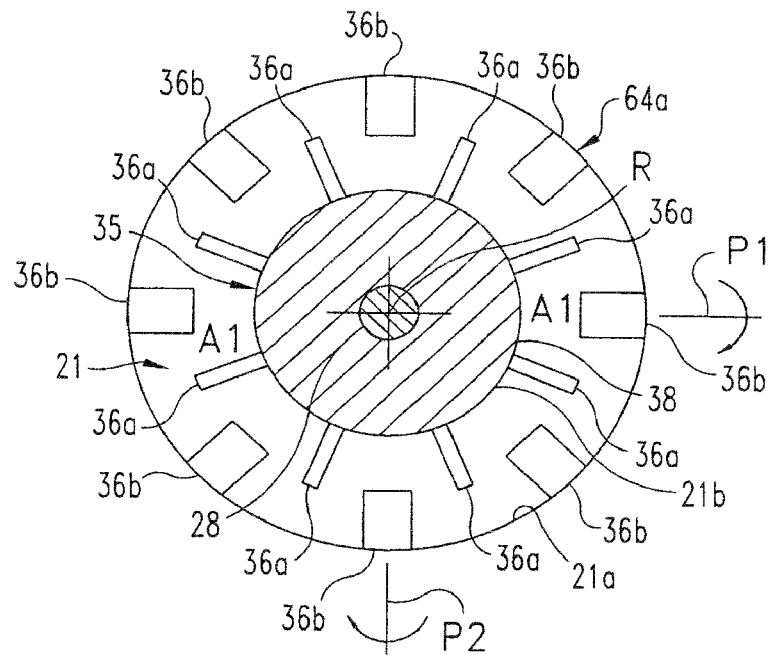
FIGS. 3 and 4 are each a partial sectional, diagrammatic views illustrating different stages of a variable geometry mechanism of the gas turbine engine taken along view line 3-3 of FIG. 2.
Figure 4:
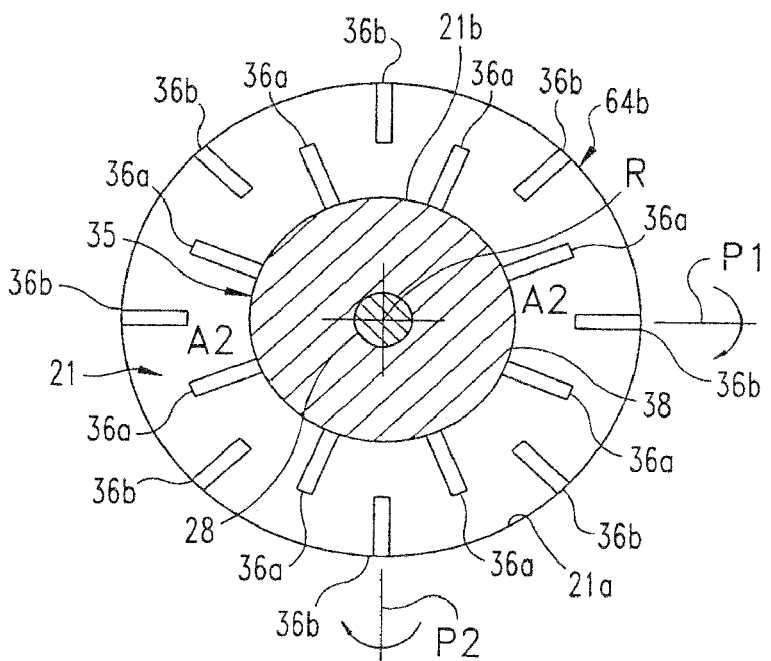

The variable geometry mechanism 60 is operatively coupled to controller 50 and is responsive to control signals therefrom as generated with variable geometry control logic 62. Mechanism 60 includes at least one actuator 61a coupled to a linkage 61b. The linkage 61b is operatively coupled to stators 36b. Actuator 61a is responsive to control signals from controller 50 to selectively adjust linkage 61b. Besides actuator 61a and linkage 61b, mechanism 60 also collectively includes the stators 36b of engine 15. The stators 36b are mechanically coupled to linkage 61b for selective repositioning as further described with reference to FIGS. 3 and 4. In FIGS. 3 and 4, two different positions of stators 36b are schematically illustrated corresponding to two different states or settings of mechanism 60, and each corresponds to a partial, diagrammatic sectional view taken along section line 3-3 of FIG. 2; where like reference numerals refer to like features.

In FIGS. 3 and 4, the working fluid pathway 21 is defined between an outer flow path wall 21a and an inner flow path wall 21b (defined by shaft 38). With respect to axis R, the stators 36b and blades 36a radially extend into the pathway 21 from wall 21a and wall 21b, respectively. Shaft 38 of compressor 35 is shown about shaft 28, which also is shown in section. Axis R is represented by crosshairs in FIGS. 3 and 4 because it is perpendicular to the view plane thereof. Stators 36b each rotate about a corresponding axis that is generally perpendicular to axis R and radially extends therefrom parallel to the view plane. Axes P1 and P2 represent two such stator rotation axes; where corresponding axes of the remaining stators 36b have been omitted to preserve clarity.

FIG. 3 represents a state 64a of the stators 36b and mechanism 60 that corresponds to one possible CVG setting/position. State 64a defines working fluid flow area A1 for pathway 21 between the interleaved blades 36a and stators 36b. FIG. 4 represents a state 64b of stators 36b and mechanism 60 that corresponds to a different CVG setting/position. State 64b defines working fluid flow area A2 for pathway 21 between the interleaved blades 36a and stators 36b. As can be observed by comparing FIGS. 3 and 4, stators 36b of state 64a present a broader profile in FIG. 3 than stators 36b of state 64b in FIG. 4. As a result, area A2 is greater than area A1, such that state 64a corresponds to a more closed position of stators 36b relative to state 64b. Conversely, state 64b corresponds to a more open position of stators 36b relative to state 64a. By varying the rotation of stators 36b, a range of positions from a most open state to a least open (most closed) state can be realized.

Figure 5:
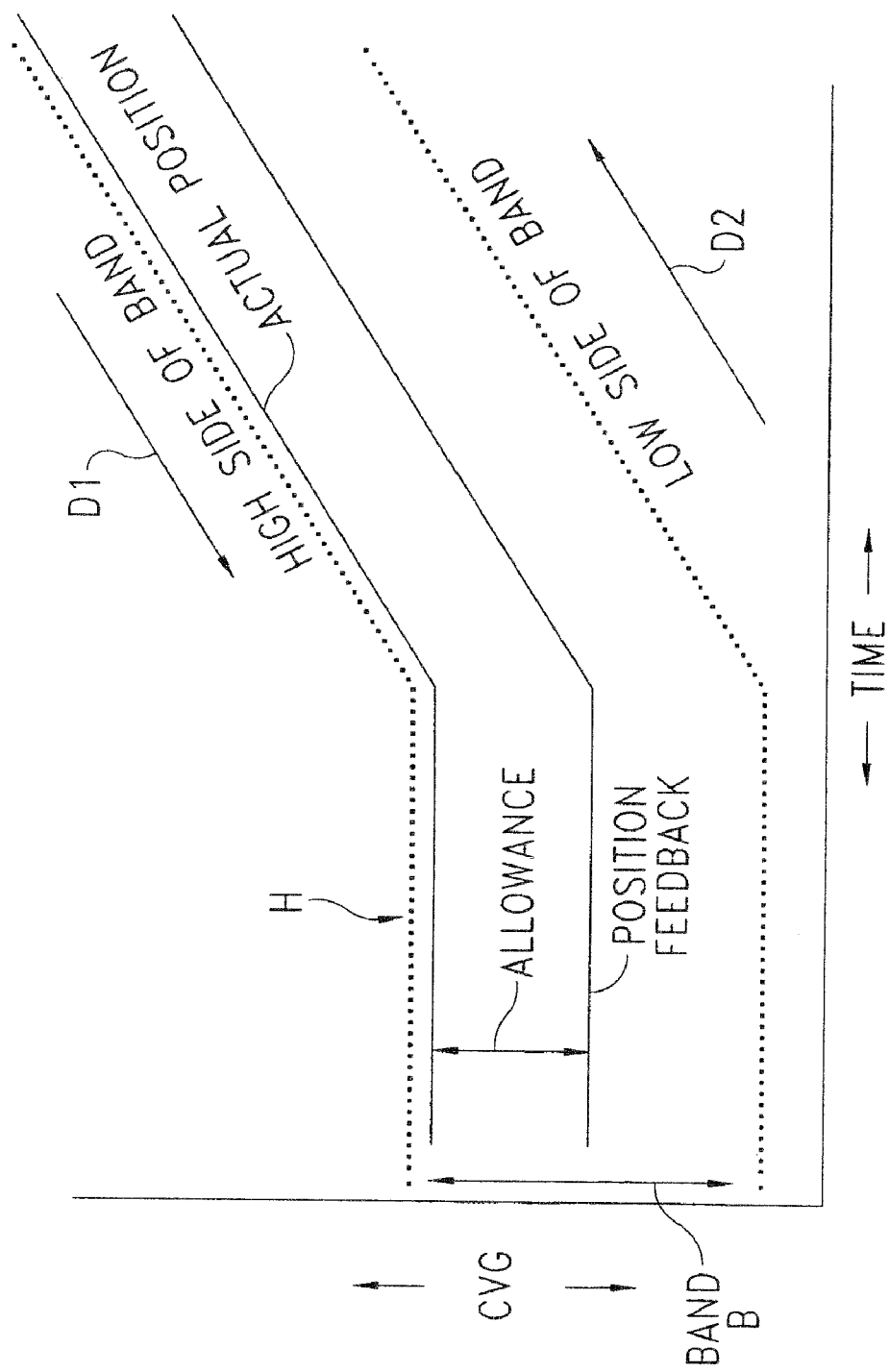
FIG. 5 is a graph illustrating mechanical hysteresis of the variable geometry mechanism of FIG. 2.

As can be observed in connection with FIG. 5 of U.S. Pat. No. 5,622,045 and its accompanying text (previously incorporated by reference), one desired procedure progressively opens CVG as rotational engine speed increases (increasing the working fluid flow area); and progressively closes CVG as rotational engine speed decreases (decreasing the working fluid flow area).

Referring further to the graph of FIG. 5 of the present application, the degree to which CVG is opened is shown relative to time for system 10—revealing a hysteresis window H with a corresponding hysteresis band B. When changing CVG in a closing direction, as represented by arrow D1 of FIG. 5, the stators 36b of mechanism 60 are at the high side of band B, as represented by the upper dotted line. In contrast, when changing CVG in an opening direction, as represented by arrow D2 of FIG. 5, the stators 36h of mechanism 60 are at the low side of band B, as represented by the lower dotted line. As previously explained, this hysteresis has been discovered to be largely mechanical in nature—resulting from linkage/interconnection slack or play, as might result from wear, environmental conditions, normal tolerances or the like, just to name a few possibilities. The solid line between the high side and low side of band B corresponds to the observed position feedback designated as signal CVGFB, which is input to controller 50 as shown in FIG. 2. CVGFB is the same regardless of the actual CVG position within band B.

Figure 6:
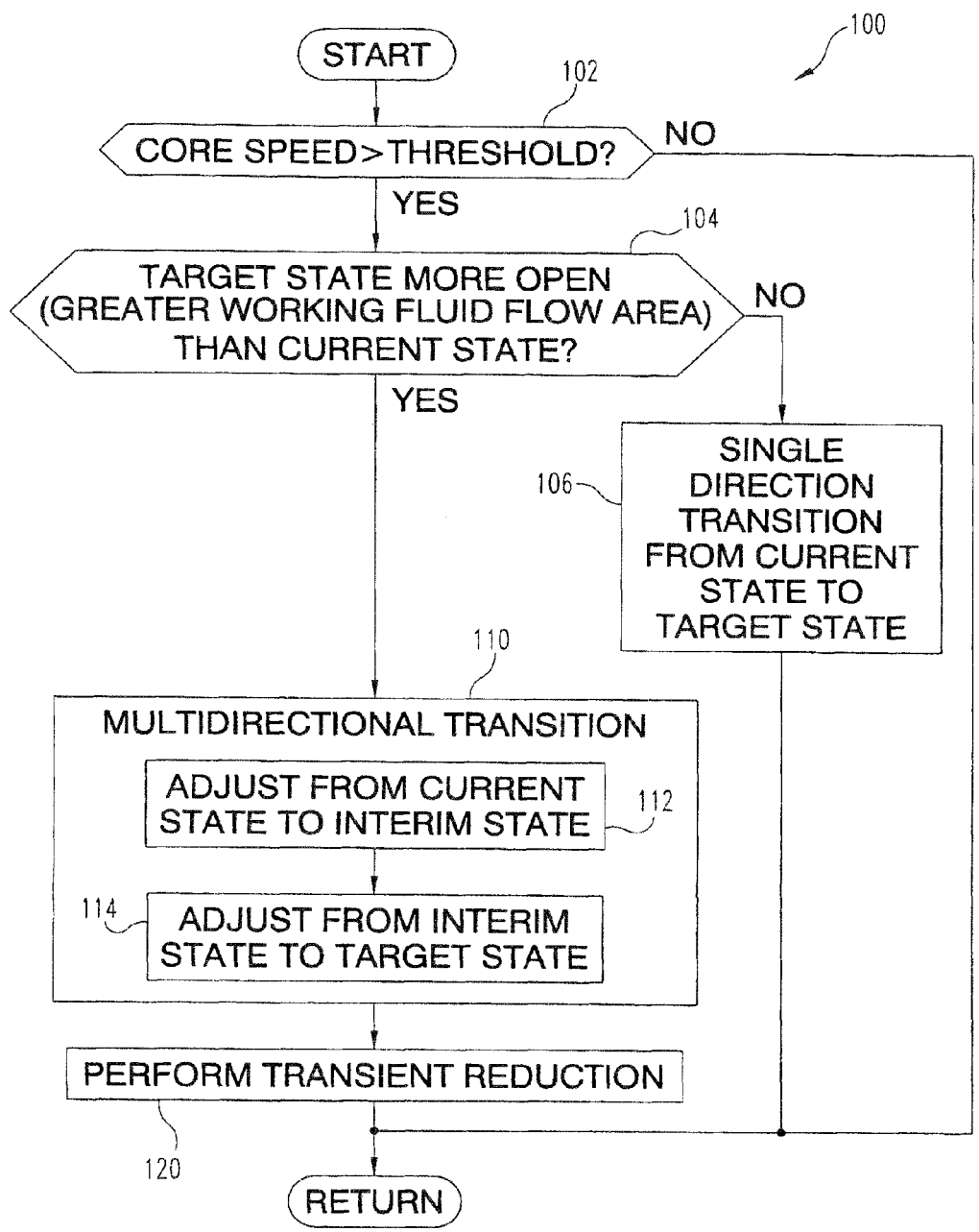
FIG. 6 is a flow chart of one mode of operating the gas turbine engine of FIG. 2 to address mechanical hysteresis of the variable geometry mechanism.

While the effects of mechanical hysteresis can be computationally addressed, it is desirable under at least some circumstances to control actual position within the hysteresis band. By way of nonlimiting example, this kind of mechanical hysteresis accommodation could be desired to reduce the chances of exceeding a performance limit, which cannot otherwise be achieved and still maintain desired efficiency. FIG. 6 provides a flowchart illustrating a procedure 100 that can be performed with system 10. Procedure 100 can be performed on a periodic or aperiodic basis, on demand, and/or in response to one or more conditions to account for mechanical hysteresis of mechanism 60. Within the procedure 100, hysteresis adjustment is conditioned on the degree to which an operating limit of engine 15 is approached. Procedure 100 is implemented in the variable geometry control logic 62 of controller 50, and is executed when a change in CVG from a current state to a target state is requested by another operating routine of system 10. Such a calling routine is typically implemented in the control logic 52 executed by controller 50. After the procedure 100 description, one nonlimiting, more detailed implementation is described with reference to the control flow diagrams of FIGS. 7-9.

The procedure 100 begins with a conditional 102 that tests whether the core rotational speed (N2) is above a threshold. In one form, this threshold can be selected relative to a safe operating limit of core 30, and/or in accordance with one or more other criteria. If the test of conditional 102 is false (negative), procedure 100 returns to the calling routine. On the other hand, if the test of conditional 102 is true (affirmative), procedure 100 continues with a conditional 104. The conditional 104 tests if the desired or target state of mechanism 60 is more open than the current state of mechanism 60. One implementation of tracking such relative changes of state is further described in connection with FIG. 7 hereinafter.

If the result of the conditional 104 test is false (negative), then procedure 100 continues with an operation 106. In operation 106, a unidirectional transition is performed in the current state to the target state. This transition is in the closing direction corresponding to arrow D1 of FIG. 5. Accordingly, the actual position of mechanism 60 is on the high side of band B. It should be appreciated that while a monotonic decrease in CVG "openness" could be used to perform operation 106, it alternatively could include direction reversals that do not fall below the target state resulting in one or more local minima; and/or may be implemented with time periods where no substantial change occurs, such as might result through implementation in multiple discrete steps. In one form, mechanism 60 approaches the target state in a decreasing, stepwise manner corresponding to descent of a staircase. After execution of operation 106, procedure 100 returns to the calling routine.

Returning to conditional 104, if the target state of mechanism 60 is more open than the current state, corresponding to a "true" (affirmative) test result, procedure 100 continues with a multidirectional transition operation 110. As a minimum, operation 110 includes two stages. In a stage 112, change in the opening direction is performed from the current state to an interim state. This interim state is more open than the target state, such that in stage 112 mechanism 60 is adjusted to go past (overshoot) the target state in the opening direction.

In a stage 114 of operation 110, adjustment direction of mechanism 60 reverses to approach the target state from the interim state. As a result, the target state is approached in a closing direction. Consequently, both the operation 106 and the operation 110 reach the target state from a change in the closing direction to consistently place the target state at the high side of the hysteresis band B (FIG. 5). It should be appreciated that in this embodiment of the present application, such a consistent final approach to the target state is subject to the test of conditional 102; however, in other embodiments this approach to a target state from a common direction regardless of whether the target state is more/less open than the current state may be based on one or more different conditions or may be unconditional—that is always performed. One possible implementation of the operation 106 and the operation 110 is further described in connection with FIG. 8 hereinafter. As in the case of operation 106, either or both of the stages 112 and 114 could be executed through a monotonic change, with local reversals between the respective states, and/or in a stepwise fashion, just to name representative alternatives. Further, it should be appreciated that a target state at the most open end of the adjustment range would require different processing because there is no ability to provide a higher interim state, and/or the range available for selection is defined with an upper extreme that is less than the most open state possible to account for this aspect.

From operation 110, procedure 100 continues with an operation 120. In operation 120, transient reduction is performed due to possible transients that may be generated by the multidirectional transition of operation 110. In particular, for system 10 in which control was based on placement at the lower side of band B when changing from a less open position to a more open position, repositioning at the high side of band B can sometimes cause a transient spike to occur. Specifically, because the shift to the high side of band B can cause a relatively rapid drop in core speed N2 compared to low side placement, no effort may be made to increase fuel flow to raise core speed N2 back to the previous level for systems based on such a pre-existing approach. In response to increased fuel, fan speed N1 typically increases to an undesirable value when engine 15 is otherwise operating with N2 near its upper limit as tested by conditional 102. This undesirable fan speed N1 increase can lead to a higher than desired ITT, and/or other untoward results until the system adjusts to the new N2 versus N1 relationship for the comparatively lower N2 resulting for CVG repositioning to the more open side of band B. The time it takes for this adjustment is designated transient time TTIM. Operation 120 is arranged to address undesired transient performance, as more particularly described in connection with FIG. 9 and accompanying text.

Alternative embodiments may include transient reduction that alternatively or additionally results from operation 106. In other embodiments, operation 120 may be performed in response to completion of operation 106 or operation 110 only when certain conditions are satisfied, operation 120 may be optional, or transient reduction/elimination may be absent. In further embodiments, it may be desirable some or all of the time to maintain CVG position toward the low side of band B instead of the high side.

Figure 7:
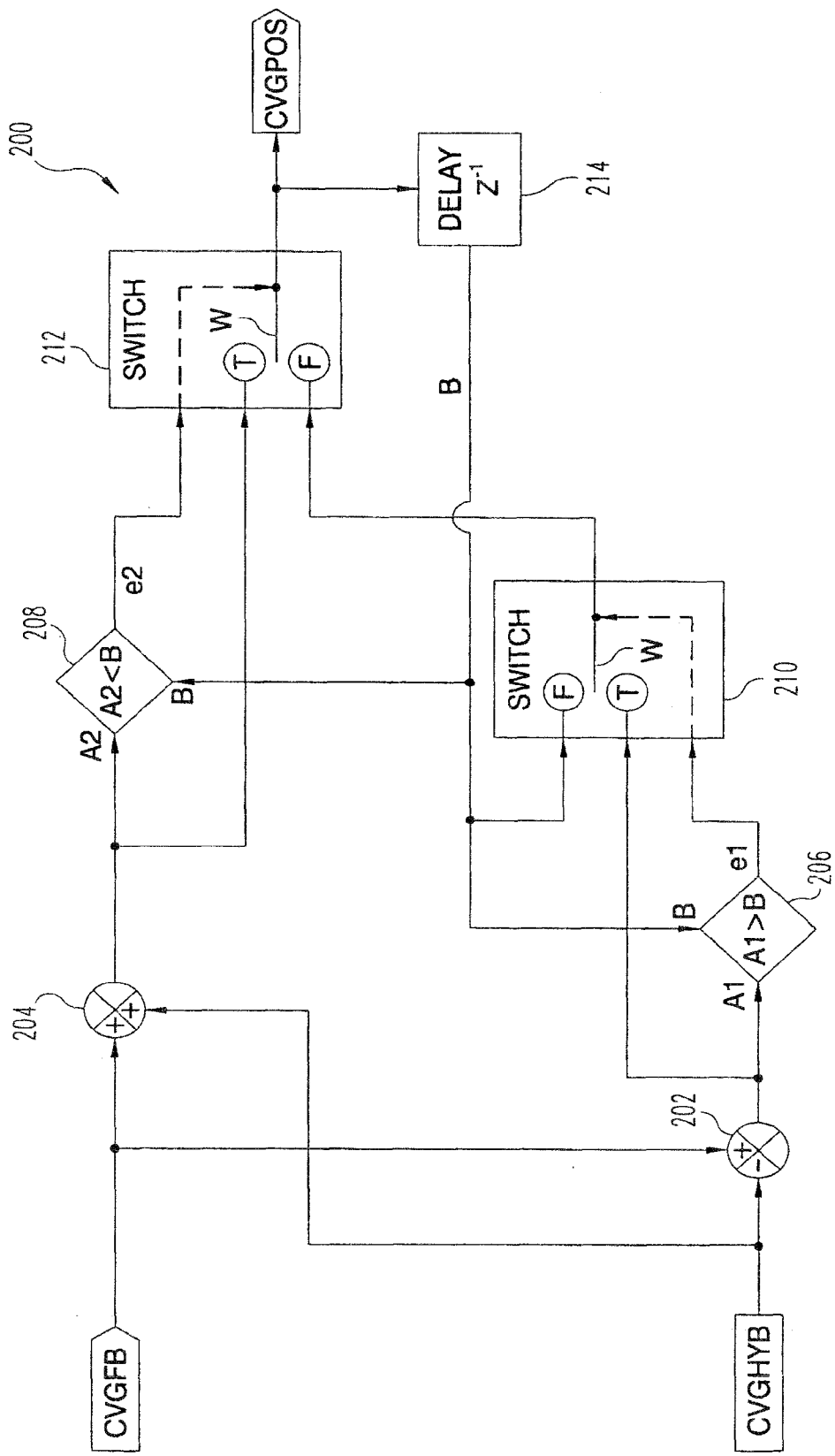
FIGS. 7-9 are control flow diagrams of selected aspects of the control system of FIG. 2.
Figure 8:
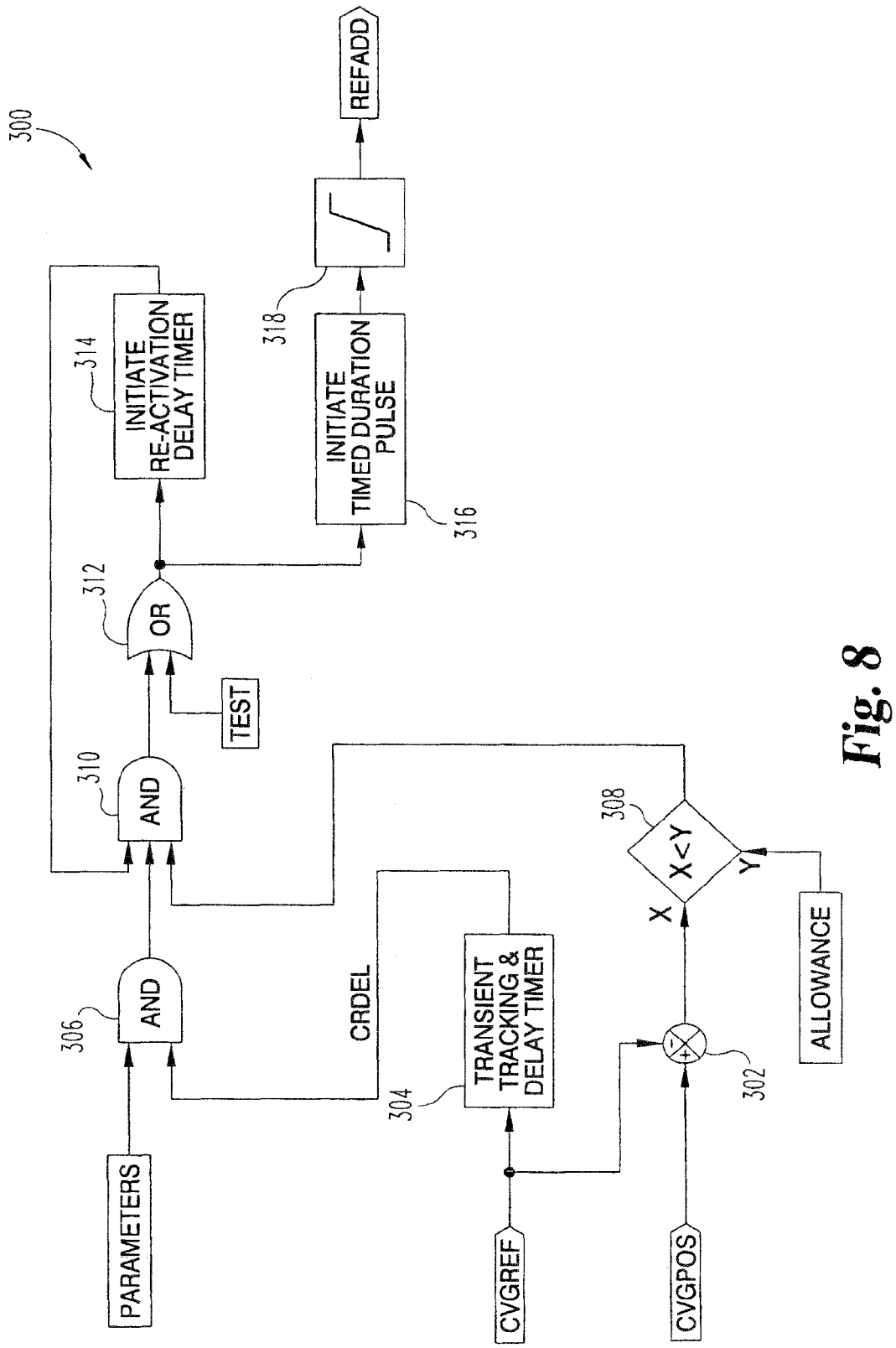
Figure 9:
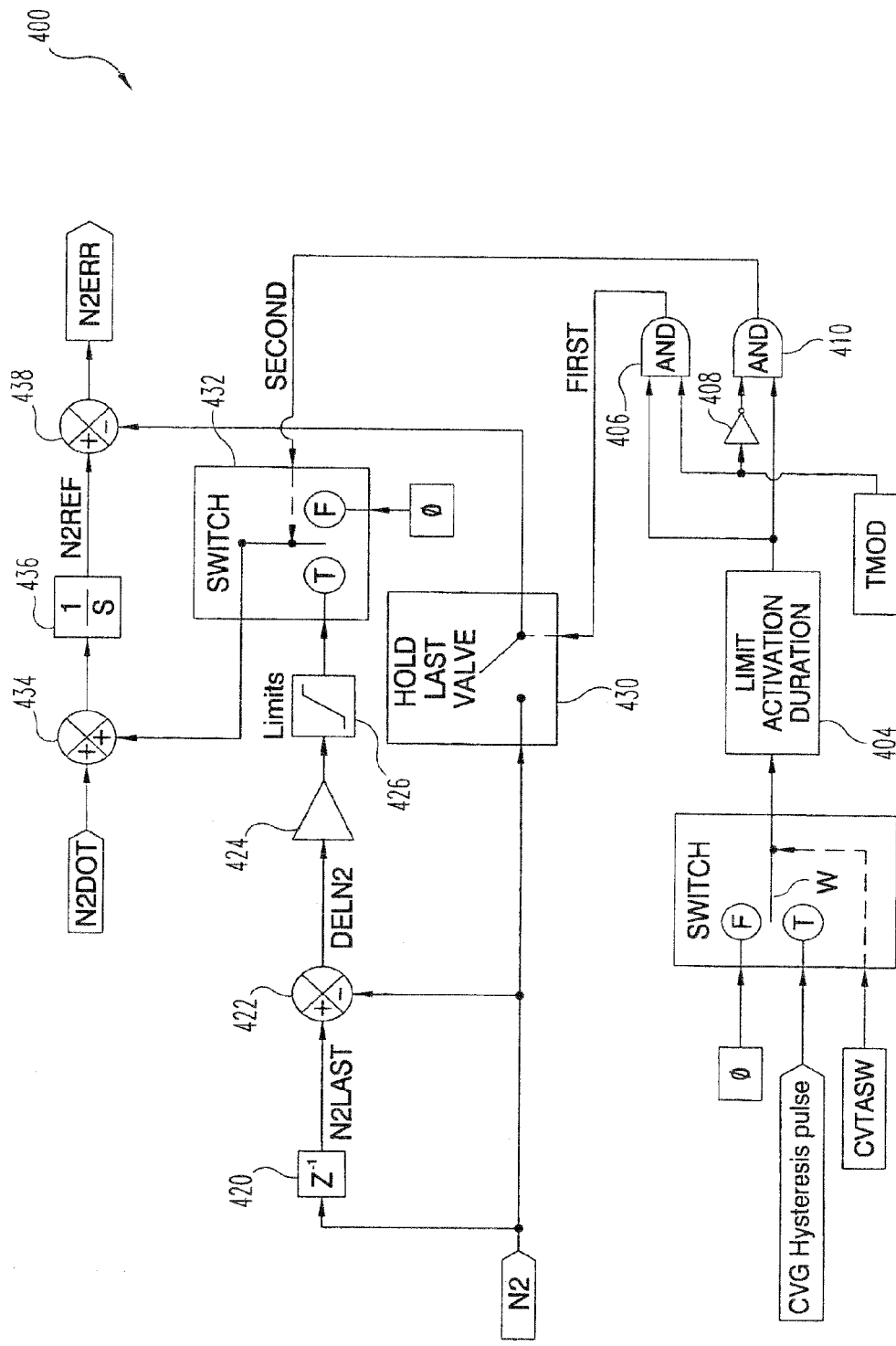

FIGS. 7-9 depict control flow diagrams describing one implementation of procedure 100 performed with system 10. Generally, the operations described in these figures are implemented in control logic 62 of controller 50 as software programming, firmware, and/or dedicated hardware, or the like. Correspondingly, logic 200, 300, and 400, as respectively depicted in FIGS. 7-9, is repetitively executed on a periodic or aperiodic basis.

More specifically, FIG. 7 depicts CVG position tracking logic 200. Logic 200 maintains a limited history of the position of the actuator 61a to track position of stators 36b relative to hysteresis band B. CVG position of mechanism 60 is determined at actuator 61a by an appropriate sensor or other measuring means (not shown) to generate CVG position feedback signal CVGFB, as depicted in FIG. 2 and FIG. 7. As obtained from actuator 61a, CVGFB does not account for hysteresis variations—instead being represented by the medial solid line within band B as depicted in FIG. 5.

Logic 200 also receives as input CVGHYB which is subtracted from CVGFB by a summation operator 202 of logic 200 and added to CVGFB by a summation operator 204 of logic 200. Signal CVGHYB is representative of the CVG hysteresis band B. The summation operator 202 outputs signal A1 (A1=CVGFB−CVGHYB), and the summation operator 204 outputs signal A2 (A2=CVGFB+CVGHYB). Signal A1 is provided as an input to a "greater than" (>) comparator 206 of logic 200 along with signal B to test if A1 is greater than B (A1>B); and signal A2 is provided as an input to a "less than" (<) comparator 208 of logic 200 along with signal B to test if A2 is less than B (A2<B). Signal A1 is also coupled to the "true" contact T of a logical switch 210, and signal A2 is also coupled to the "true" contact T of a logical switch 212. The switches 210 and 212 are both of the single pole, double throw type. The respective outputs of the comparators 206 and 208 are discrete evaluation/result signals e1 and e2 that are so distinguished by lower case letters relative to other signals. These signals are true (affirmative) if the corresponding comparator (> or <) is true and false (negative) otherwise. Signals e1 and e2 are also respectively coupled to an evaluation input (dashed line) of the switches the 210 and 212. If the evaluation input is true, then the switch wiper W contacts the true contact T and otherwise contacts the false contact F for each of the switches 210 and 212. The false contact F of switch 210 is coupled to signal B, and the false contact F of switch 212 is coupled to the output of switch 210.

Signal B is output by a delay stage 214. Delay stage 214 captures the prior value of CVGPOS, which represents the CVG position determined during the most recent prior execution of logic 200 as output by switch 212. Accordingly, delay stage 214 sets B equal to CVGPOS as determined during this prior execution. From logic 200, CVGPOS is determined as follows:
  (a) if A1>B [(CVGFB−CVGHYB)>prior CVGPOS], then current position=CVGPOS=CVGFB−CVGHYB;
  (b) if A2<B [(CVGFB+CVGHYB), prior CVGPOS], then current position=CVGPOS=CVGFB+CVGHYB; and
  (c) if A1≦B [(CVGFB−CVGHYB)≦prior CVGPOS], then current position=CVGPOS=prior position=B.

In other words, if (a) A1>B, then CVG is opening (changing in the opening direction) and is at the low side of hysteresis band B; (b) if A2<B, then CVG is closing (changing in the closing direction) and is at the high side of band B; and (c) if A1≦B and A2≧B, no change has occurred so CVG is at the same side of the hysteresis band B as for the prior execution of logic 200.

FIG. 8 depicts CVG adjustment logic 300 that is repetitively executed to generate the signals sent to actuator 61a for changing CVG as desired. Signal CVGREF corresponds to a nominal reference position that may be selected based on any desired criteria. Typically, CVGREF is scheduled through a table and/or function(s) relative to efficiency and/or engine operating extremes, such as surge margin and the like. Logic 300 is responsive to CVGPOS from logic 200 during stable operation and selectively generates signals to reach a target setting from a more open position (in the closing direction) under certain conditions—such as core speed N2 exceeding an upper threshold near its maximum desired operating speed.

Logic 300 includes a summation operator 302 that subtracts CVGREF from CVGPOS and provides the result as signal X (X=CVGPOS−CVGREF). CVGREF is also provided to a delay stage 304 to produce a delayed discrete signal CRDEL to filter-out certain transients indicative of rapidly changing operation. The resulting delayed signal, CRDEL, is of a discrete (boolean) type, and is provided to one input of a two-input AND gate 306. The other input of the gate 306 receives a discrete signal corresponding to the collective evaluation of various engine and/or control system parameters. In one example, these parameters could include one or more of a requisite engine thrust mode, throttle level TLA, N1 level, N2 level, CVG headroom, and/or other parameters as desired, that need to be present before hysteresis adjustment is performed. This evaluation corresponds to the conditional 102 of procedure 100 previously described in connection with FIG. 6. In still other embodiments, a different parameter set is evaluated or none are evaluated. If the latter, it would dispose of the need for gate 306 because this second input would always be true.

The output signal X and a hysteresis allowance parameter Y are input to a less than (<) comparator 308. Parameter Y represents a hysteresis allowance amount for comparison to X, the difference between CVGREF and CVGPOS (X=CVGPOS−CVGREF). When the output of the comparator 308 is true (X<Y), it indicates the CVG position is not at the open side of the hysteresis band B. The output of gate 306 and the output of comparator 308 are input to a three-input AND gate 310. Also input to the gate 310 is a discrete output of a delay timer 314 that is false for a selected duration after each CVG adjustment caused by logic 300 to space-out CVG adjustment in response thereto. Correspondingly, the output of the gate 310 is true if: the output of the gate 306 is true (parameters and timer 304 outputs both true), the output of the comparator 308 is true (X<Y), and the delay timer 314 has returned to true after the selected duration.

The output of gate 310 is input to a two-input OR gate 312 along with a test override signal. Accordingly, gate 312 outputs true if the input from gate 310 is true, the test override input signal is true, or both are true. The output of gate 312 is input to the timer 314 and pulse logic 316. If this output is true, timer 314 is reset such that re-activation of actuator 61a of mechanism 60 is delayed for at least the specified timer duration; and logic 316 sends a control signal pulse to actuator 61a to correspondingly adjust CVG in the opening or closing direction. A limiter 318 limits the pulse as appropriate, and outputs a corresponding CVG reference addend, REFADD when further CVG actuation is needed to approach a target position in a closing direction.

FIG. 9 depicts CVG transient reduction logic 400. Logic 400 is directed to an embodiment in which fuel control runs to a reference core speed N2 that is determined with an integrator to maintain fan speed N1 at a scheduled value. For this approach, core speed N2 typically drops when adjusting CVG from the low side to the high side of hysteresis band B. This N2 drop usually results in a temporary fueling increase that may cause fan speed N1 to increase an undesirable amount and/or excessive ITT temperature spiking. Correspondingly, a transient time period lapses before adjusting to a new relationship between N1 and N2 for the CVG shift to the high side.

Logic 400 implements two switch-selectable alternative approaches to addressing this type of transient performance. Logic 400 includes a logical switch 402 of the single pole, double throw type. Switch 402 has a false contact F set to zero (false), and a true contact T corresponding to a CVG hysteresis pulse. Selection among the contacts is made by discrete input CVTASW, which activates use of logic 400 to address transients when true (CVTASW=1), so that the CVG pulse is output, and disables transient reduction logic 400 when false (CVTASW=0) by the output of zero. A nonzero output of switch 402 resets a timer 404 to time a period during which logic 400 will be active until timer 404 is reset again. Timer 404 outputs a discrete 'true' signal during the activation period to each of two different two-input AND gates 406 and 410. Also input to gate 410 is a transient reduction mode signal TMOD, which is used to select the mode of transient reduction. TMOD is also input to an inverter 408 which outputs the inverted TMOD signal that is provided to the other input of gate 406. If TMOD is true (TMOD=1), and transient reduction is active (output of timer 404 is true=1), then the output of gate 406 is true (logic level 1). Conversely, by operation of inverter 408, the output of gate 410 is false (logic level 0). If TMOD is false (TMOD=0), and transient reduction is active (output of timer 404 is true=1), then the situation is reversed with the output of gate 406 being false (logic level 0), and the output of gate 410 being true (logic level 1). It follows that at most only one of gates 406 and 410 will output true at a given time. Accordingly, a true output from gate 406 corresponds to a first reduction mode, FIRST and a true output from gate 410 corresponds to a second reduction mode, SECOND.

Logic 400 also includes a delay stage 420 to output N2LAST, the value of N2 from the most recent prior execution of logic 400. N2LAST is provided to a positive input of a summation operator 422 and N2 is provided to a negative input of the summation operator 422. Summation operator 422 generates output DELN2=N2LAST−N2. DELN2 is input to an amplifier 424 to provide a desired gain level and then limited by a limiter 426 of logic 400.

The output of limiter 426 is input to the true contact (T) of a logic switch 432. Logic switch 432 corresponds to a single pole, double throw type of the kind previously described in connection with logic 200 of FIG. 7. The false contact (F) of switch 432 is coupled to a constant zero input. The conditional input to switch 432 is the output of the gate 410 designated as signal SECOND. The output of switch 432 is provided to a positive input of a summation operator 434. The derivative of N2 is N2DOT, which is provided to another positive input of the summation operator 434. The output of the operator 434 is input to an integrator 436 to generate N2REF. N2REF is provided to a positive input of summation operator 438. A negative input of the operator 438 is provided by the output of a "last value hold" switch 430. Switch 430 represents a "hold last value" operator that outputs the current value of N2 when signal FIRST=0, and outputs a previous value as a held constant when signal FIRST=1. Summation operator 438 provides signal N2ERR, the difference between NREF and N2, which adjusts fueling.

The conditional discrete inputs to switches 430 and 432 are coupled to the outputs of the gates 406 and 410, respectively. Accordingly, if TMOD=1 while reduction is active, switch 430 is closed in response to a true output of gate 406, and the zero constant of contact F is routed to the operator 434 through the switch 432 in response to a false output from gate 410. For the first reduction mode (TMOD=1), the level of N2 feedback is arrested for a specified time period while N2 changes with CVG repositioning. As implemented in logic 400, the opening of gate 430 provides a constant N2 feedback to summation operator 438 to be subtracted from N2ERR (N2ERR=N2REF−N2). This approach prevents the N2ERR signal output from operator 438 from reacting to a drop in N2 initiated by the CVG hysteresis control action. When the output of gate 406 becomes false, as by expiration of the activation duration of timer 404, integrator 436 is reset, and provides for smooth transition back to the use of current N2 feedback through operator 430. Further, the N1 primary control loop may be modified in terms of gain or otherwise while the secondary N2 control loop is arrested in this manner (switch 430 closed).

In the second reduction mode (TMOD=0), input to the integrator 436 is adjusted via operator 434 to drive the integrator output N2REF down to correspond to the observed N2 over the time it takes for N2 speed to respond to CVG repositioning. Accordingly, DELN2 as modified by amplifier 424 and limiter 426, are added to N2DOT to provide the resulting sum to integrator 436. The resulting N2REF signal has been adjusted by a magnitude corresponding to the effect of CVG hysteresis control action on N2 so that the N2ERR signal calculated by operator 438 does not react too strongly.

Many different embodiments are envisioned, for example, logic 200, 300, and/or 400 can be adapted to other control systems as desired to desirably approach a target CVG position or setting from a common direction some or all of the time and/or with or without transient reduction. In an alternative embodiment of the present application, more or fewer gas turbine engines are utilized with or without aircraft. Also, one or more engines may not include a high bypass fan stage. In one form, Engine Pressure Ratio (EPR) is used in addition to or in lieu of fan speed (N1) as the primary feedback signal. In still other embodiments a different engine control strategy, different feedback parameters, and the like may be used with or without N1 feedback control. Furthermore, in another embodiment, the gas turbine engine is a turboshaft engine which powers another device via a mechanical linkage so that no appreciable thrust results for propulsion.

It is also envisioned that the present invention may be used with gas turbine engines having different arrangements of rotating members, such as those including more or fewer compressors, turbines, or spools. Alternatively or additionally, more or fewer stators 36b are reconfigurable for CVG, some or all of blades 36a are pivotable to provide CVG, and/or a different type of CVG mechanism is used. In still other embodiments, CVG according to the present invention is used in a different application besides a gas turbine engine. In yet other embodiments, variable geometry vanes operate in accordance with the hysteresis accommodation techniques described herein in other devices besides a compressor— such as a turbine or the like.

Another embodiment of the present application includes a gas turbine engine with a variable geometry mechanism including a number of vanes. This mechanism is operated to vary working fluid flow area between the vanes over a range extending from a first extreme to a second extreme. One of the extremes defines a greater flow area than another of these extremes. Within this range, a desired setting is selected that is different from the current setting, such that the desired setting is closer to the first extreme than the current setting. To control hysteresis of the variable geometry mechanism relative to a transition from the current setting to the desired setting, the variable geometry mechanism is adjusted from the current setting to an interim state closer to the first extreme than the desired setting, and subsequently from the interim state to the desired setting.

A further embodiment of the present application includes: operating a compressor with a working fluid passage that includes a variable geometry mechanism operable over a range from a least open state to a most open state relative to the working fluid passage, selecting a desired setting of the mechanism that is more open than the current setting, and controlling hysteresis of the mechanism by opening such mechanism from the current setting to a more open setting than the desired setting and closing such mechanism from the more open setting to the desired setting.

Still a further embodiment of the present application includes: operating a gas turbine engine including a compressor with a variable geometry mechanism that has a number of vanes operable to vary flow area for working fluid passing between the vanes, selecting a desired setting of the variable geometry mechanism different than the current setting to change the flow area, and controlling hysteresis of the mechanism by one of increasing or decreasing the flow area from the current setting to an interim state followed by another of increasing or decreasing the flow area from the interim state to the desired setting.

Yet a further embodiment of the present application includes a gas turbine engine with a variable geometry mechanism. This mechanism has a number of vanes and is operable to vary working fluid flow area between the vanes over a range extending from a first extreme to a second extreme. One of these extreme defines a greater flow area than the other. Also included is an input device coupled to a gas turbine engine that is operable to select a desired setting of the mechanism different from the current setting. This desired setting is closer to the first extreme than the current setting. Further included is a controller responsive to the input device to generate one or more control signals to control hysteresis of the variable geometry mechanism and to which the variable geometry mechanism is responsive to change from the current setting to an interim state closer to the first extreme than the desired setting and subsequently to change from the interim state to the desired setting.

Another embodiment of the present invention includes logic executable by a controller to control operation of a gas turbine engine including a compressor with variable geometry vanes. The vanes are adjustable over a range from a least open state to a most open state relative to a working fluid flow area between the vanes. This logic is operable to control mechanical hysteresis of vane adjustment in response to an input to change the vanes from a current setting to a desired setting by opening the vanes from a current setting to an interim state and closing the vanes from an interim state to the desired setting. This desired setting is more open than the current setting and less open than the interim state.

In still another embodiment, a gas turbine engine includes a compressor with a variable geometry mechanism that operates to vary an amount of flow area for a working fluid passing through the compressor. Also included are means for selecting a target setting of the mechanism different than the current setting to change the amount of flow area and means for determining if the target setting has a greater flow area or lesser flow area than the current setting and for controlling operation of the mechanism within the hysteresis band by one of increasing or decreasing the flow area from the current setting to an interim state followed by another of increasing or decreasing the flow area from the interim state to the desired setting.

A further embodiment includes: a gas turbine engine including a compressor, the compressor including a variable geometry mechanism that operates to vary an amount of flow area for a working fluid passing through the compressor; means for selecting a target state of the variable geometry mechanism different than a current state of the variable geometry mechanism to change the amount of flow area, the variable geometry mechanism having a hysteresis band corresponding to a difference between reaching the target state by increasing or reaching the target state by decreasing the amount of flow area; and means for determining if the target state has a greater flow area or a lesser flow area than the current state and for controlling operation of the variable geometry mechanism within the hysteresis band by one of increasing or decreasing the flow area from the current state to an interim state followed by another of increasing or decreasing the flow area from the interim state to the desired state.

All publications, patent, and patent applications cited in this specification are herein incorporated by reference as if each individual publication, patent, or patent application were specifically and individually indicated to be incorporated by reference and set forth in its entirety herein. Any theory of operation or finding described herein is merely intended to enhance understanding of the present invention and should not be construed to limit the scope of the present invention as defined by the claims that follow to any stated theory or finding. While the invention has been illustrated and described in detail in the drawings and foregoing description, the same is to be considered as illustrative and not restrictive in character, it being understood that only selected embodiments have been shown and described and that all changes, modifications, and equivalents that come within the spirit of the invention as defined herein or by the following claims are desired to be protected.

What is claimed is:

1. A system, comprising:
    a gas turbine engine including a variable geometry mechanism with a number of vanes, the variable geometry mechanism being operable to vary working fluid flow area between the vanes over a range extending from a first extreme to a second extreme, one of the first extreme and the second extreme defining a greater flow area than another of the first extreme and the second extreme;
    an input device coupled to the gas turbine engine that is operable to select a desired state of the variable geometry mechanism different than a current state of the variable geometry mechanism, the desired state being closer to the first extreme than the current state;
    a controller responsive to the input device to generate one or more control signals to control hysteresis of the variable geometry mechanism according to a hysteresis band; and
    wherein the variable geometry mechanism is responsive to the control signals to change from the current state to an interim state closer to the first extreme than the desired state and subsequently to change from the interim state to the desired state.

2. The system of claim 1, wherein the vanes are of a stator type.

3. The system of claim 1, further comprising means for determining if the desired state corresponds to a flow area greater than or less than the current state.

4. The system of claim 1, wherein the input device includes an operator throttle control, and further comprising an aircraft, the gas turbine engine being operable to propel the aircraft and selectively adjust the variable geometry mechanism in response to the throttle control.

5. The system of claim 1, wherein the gas turbine engine includes a first compressor connected to rotate with a first turbine, the first compressor including the variable geometry mechanism.

6. The system of claim 1, wherein the variable geometry mechanism is structured with the first extreme corresponding to a maximum flow area, the second extreme corresponding to a minimum flow area, the interim state corresponding to a flow area greater than the desired state, and the desired state corresponding to a flow area greater than the current state.

* * * * *